US010278264B2

(12) United States Patent
Hick

(10) Patent No.: US 10,278,264 B2
(45) Date of Patent: Apr. 30, 2019

(54) SYSTEM FOR PREVENTING EXCESSIVE CABLE HEATING IN POWER OVER ETHERNET-BASED LIGHTING SYSTEMS

(71) Applicant: Leviton Manufacturing Company, Inc., Melville, NY (US)

(72) Inventor: Robert L. Hick, Newberg, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 150 days.

(21) Appl. No.: 15/670,721

(22) Filed: Aug. 7, 2017

(65) Prior Publication Data

US 2018/0063928 A1    Mar. 1, 2018

Related U.S. Application Data

(60) Provisional application No. 62/380,540, filed on Aug. 29, 2016.

(51) Int. Cl.
*H05B 37/02*    (2006.01)
*H05B 33/08*    (2006.01)
(Continued)

(52) U.S. Cl.
CPC ......... *H05B 37/0263* (2013.01); *H04L 12/10* (2013.01); *H04L 12/40* (2013.01);
(Continued)

(58) Field of Classification Search
None
See application file for complete search history.

(56) References Cited

U.S. PATENT DOCUMENTS 7,587,289 B1    9/2009  Sivertsen
7,885,250 B2    2/2011  Whittaker
(Continued)

FOREIGN PATENT DOCUMENTS

JP    2013093323 A    5/2013
WO   2014002073 A1   1/2014
(Continued)

OTHER PUBLICATIONS

Boyce et al., "Low Voltage LED Lighting Control System"; Project Plan, May 13, 2013.
(Continued)

*Primary Examiner* — Elmito Breval

(57) ABSTRACT

A system is disclosed for controlling operation of an LED lighting system, including a Power over Ethernet (PoE) LED driver couplable to a PoE switch via a power and communication link. The PoE LED driver includes a microcontroller for controlling an LED driver chip to operate an associated LED lighting fixture. A voltage and current measurement unit is coupled to the microcontroller to receive power from the power and communication link, and to provide signals to the microcontroller. The provided signals can be representative of an input electrical parameter of the power and communication link. The microcontroller is programmed to compare the signals representative of the input electrical parameter against a predetermined value, and command operation of the LED driver chip based on the comparison.

17 Claims, 4 Drawing Sheets

(51) Int. Cl.
*H04L 12/40* (2006.01)
*H04L 12/10* (2006.01)

(52) U.S. Cl.
CPC ..... *H05B 33/0815* (2013.01); *H05B 33/0854* (2013.01); *H05B 37/0254* (2013.01)

(56) References Cited

U.S. PATENT DOCUMENTS

| | | | |
|---|---|---|---|
| 8,058,750 | B2 | 11/2011 | Covaro et al. |
| 8,159,156 | B2* | 4/2012 | Henig ............... H05B 37/0254 315/294 |
| 8,207,635 | B2 | 6/2012 | Covaro |
| 8,248,230 | B2 | 8/2012 | Covaro et al. |
| 8,344,641 | B1 | 1/2013 | Isaacson et al. |
| 8,390,441 | B2 | 3/2013 | Covaro et al. |
| 8,427,300 | B2 | 4/2013 | Covaro et al. |
| 8,493,005 | B2 | 7/2013 | Warton |
| 8,662,734 | B2 | 3/2014 | Covaro |
| 8,706,310 | B2 | 4/2014 | Barrilleaux |
| 8,710,759 | B1 | 4/2014 | Isaacson et al. |
| 8,710,772 | B2 | 4/2014 | Henig et al. |
| 8,729,835 | B2 | 5/2014 | Henig et al. |
| 8,742,680 | B2 | 6/2014 | Cowburn |
| 8,890,663 | B2 | 11/2014 | Covaro et al. |
| 8,890,679 | B2 | 11/2014 | Covaro et al. |
| 9,155,171 | B1 | 10/2015 | Hughes |
| 9,295,142 | B1 | 3/2016 | Leinen et al. |
| 2006/0266273 | A1 | 11/2006 | Westberg et al. |
| 2009/0066486 | A1 | 3/2009 | Kiekbusch et al. |
| 2009/0322250 | A1 | 12/2009 | Zulim et al. |
| 2010/0102734 | A1 | 4/2010 | Quick et al. |
| 2011/0199004 | A1 | 8/2011 | Henig et al. |
| 2011/0273108 | A1 | 11/2011 | Sivertsen |
| 2012/0223650 | A1 | 9/2012 | Radermacher |
| 2012/0271477 | A1 | 10/2012 | Okubo et al. |
| 2012/0275084 | A1 | 11/2012 | Familiant et al. |
| 2012/0313544 | A1 | 12/2012 | Shimomura et al. |
| 2013/0107041 | A1 | 5/2013 | Norem et al. |
| 2013/0119892 | A1 | 5/2013 | Feri et al. |
| 2013/0144448 | A1 | 6/2013 | Luerkens et al. |
| 2013/0151025 | A1 | 6/2013 | Wendt et al. |
| 2013/0159754 | A1 | 6/2013 | Wendt |
| 2013/0193873 | A1 | 8/2013 | Isaacson et al. |
| 2014/0232299 | A1 | 8/2014 | Wang |
| 2014/0371876 | A1 | 12/2014 | Isaacson |
| 2015/0195883 | A1* | 7/2015 | Harris ............... H05B 33/0845 315/155 |
| 2016/0036268 | A1* | 2/2016 | Laherty ............. H02J 7/0068 307/19 |

FOREIGN PATENT DOCUMENTS

| | | |
|---|---|---|
| WO | 2014024064 A2 | 2/2014 |
| WO | 2014024072 A2 | 2/2014 |
| WO | 2014033575 A1 | 3/2014 |
| WO | 2014045154 A1 | 3/2014 |
| WO | 2014060890 A2 | 4/2014 |
| WO | 2014162279 A1 | 10/2014 |
| WO | 2014198533 A2 | 12/2014 |
| WO | 2014206797 A1 | 12/2014 |

OTHER PUBLICATIONS

Brossart et al., "Ember" Final Paper, Apr. 29, 2013.
Boyce et al. "Ember, Power of Ethernet LED Lighting," Final Presentation, May 13, 2013.
"A Comparison of CommScope's Redwood intelligent Lighting network and Power of Ethernet (PoE) Lighting Control Systems," Commscope White Paper; www.commscope.com, WP-107766.1-EN (Apr. 2014).

* cited by examiner

SYSTEM FOR PREVENTING EXCESSIVE CABLE HEATING IN POWER OVER ETHERNET-BASED LIGHTING SYSTEMS

CROSS-REFERENCE TO RELATED APPLICATIONS

This application claims priority to pending U.S. Provisional Patent Application Ser. No. 62/380,540, filed Aug. 29, 2016, titled "System for Preventing Excessive Cable Heating in Power over Ethernet-Based Lighting Systems," the entirety of which application is incorporated by reference herein.

FIELD OF THE DISCLOSURE

The present disclosure relates generally to lighting systems, and more particularly to an improved system and method for preventing excess cable heating in Power over Ethernet (PoE) lighting systems.

BACKGROUND OF THE DISCLOSURE

Power over Ethernet (PoE) is a technology for supplying low voltage current and data over a common point-to-point Ethernet network cable to locations with applications that require both mediums. In some cases, power is carried on the same conductors that carry data. In other cases, power is carried on dedicated conductors within the same cable as the conductors that carry data. Applications that currently benefit from PoE technology include Voice over Internet Protocol (VoIP), Internet Protocol (IP) cameras, wireless local area networks (WLAN), Wireless Access Points (WAP), Building Automation Systems (BAS), and security and access control systems.

PoE currently has two standards: Institute of Electrical and Electronics Engineers (IEEE) 802.3 of (the original PoE standard) and IEEE 802.3 at (known as PoE plus), which provide, respectively, about 13 Watts and about 25.5 Watts of power to connected devices. PoE has several advantages over traditional power systems used in homes and commercial buildings. For example, PoE systems are relatively low voltage, thus eliminating the need to run expensive high voltage wiring and conduit for lighting. In addition, installation of PoE wiring can be faster than with traditional power systems because Ethernet cabling employs simple plug-in end connections. Where Ethernet cabling is already in place (i.e., for data transmission), PoE functionality can be achieved without the need for additional wiring installation.

Light emitting diode (LED) luminaires can benefit from connection to a PoE network. Recent advances have reduced the power required to operate LED luminaires to a point where network switches that are compliant with PoE standards, such as IEEE 802.3 at, can supply the power required by the LED luminaires. In addition, digital Ethernet communications can be used to command the LED luminaires to dim and brighten, as well as to report status such as lamp failure and energy consumption.

With higher power PoE systems, such as standard IEEE 802.3 at (25.5 Watts), and especially with proposed standards such as IEEE 802.3 bt, which may allow 60-100 Watts of power to be supplied, it is possible that excessive heating can occur if the category of cable used to connect the power sourcing equipment (e.g., PoE switches, PoE midspan devices) to the powered devices such as LED drivers, is of insufficient gauge to accommodate the power level.

This problem may be exacerbated by PoE LED Drivers because many PoE LED drivers deliver constant power (current or voltage) to connected LED light fixtures, regardless of input voltage, due to the nature of the switching circuit commonly employed to drive LED light sources. In such cases, as the cable heats up due to current flow, the resistance of the cable will increase, thus causing the voltage drop across the cable to increase and the input voltage to the LED driver to drop. In response, the LED driver may increase input current to maintain constant power to the LED light fixture which, in turn, can cause additional cable heating, further lowering the driver input voltage and further increasing the current supplied to the fixture. As will be appreciated, this can cause a thermal-runaway condition with respect to the cable, and may continue until the system fails.

It would, therefore be desirable to provide a PoE LED lighting system that is capable of sensing when a cable is approaching an excessive heating condition and can automatically change the operating characteristics of the PoE LED driver to ensure that overheating and system failure do not occur. Such a system should also provide information and/or an alert to the system or user to ensure that corrective action is taken.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a system for controlling operation of an LED lighting system. The system may include a Power over Ethernet (PoE) LED driver connectable to a PoE switch via a power and communication link. The PoE LED driver may include a microcontroller for controlling an LED driver chip to operate an associated LED lighting fixture. The system may also include a voltage and current measurement unit coupled to the microcontroller. The voltage and current measurement unit may receive power from the power and communication link, and may provide signals to the microcontroller. The provided signals representative of an input electrical parameter of the power and communication link. The microcontroller may be programmed to: (i) compare the signals representative of the input electrical parameter against a predetermined value; and (ii) command operation of the LED driver chip based on the comparison.

The PoE Switch may be a midspan power source. The input electrical parameter may be voltage and the predetermined value may be a minimum voltage. The microcontroller may be programmed to command the LED driver chip to reduce a power supplied to the LED light fixture when the input electrical parameter is less than the predetermined value. The input electrical parameter may be current and the predetermined value may be a maximum current. The microcontroller may be programmed to command the LED driver chip to reduce a power supplied to the LED light fixture when the input electrical parameter is greater than the predetermined value.

The input electrical parameter may be representative of an operating temperature of the power and communication link.

The predetermined value may be stored in non-volatile memory associated with the microcontroller. The predetermined value may be an initial measured value of the input electrical parameter obtained with the power and communication link at a nominal temperature and the LED light fixture driven at full output by the LED driver chip.

The microcontroller may be programmed to repeat the compare and command steps at a predetermined time interval.

The microprocessor may be programmed to send an alert signal to a building automation system or other remote device, via the power and communication link and the PoE switch, when the input electrical parameter is representative of a resistance value for the power and communication link that exceeds the predetermined value.

The microprocessor may be programmed to store in non-volatile memory information representative of the signals received from the voltage and current measurement unit.

The power and communication link may be a category 5 (CAT5) cable, a category 6 (CAT6) cable, or any other cable type capable of carrying power and control signals.

The PoE LED driver may include an Ethernet transformer for receiving the first control signals from the first power and communication link and for providing conditioned first control signals to the microcontroller. The PoE LED driver may include a bridge rectifier for receiving the power from the first power and communication link and for providing rectified direct current (DC) power to the voltage and current measurement unit.

The LED driver chip may be configured to dim an LED array of the associated LED lighting fixture in response to a command from the microcontroller.

The LED driver chips may include a circuit, a discrete chip, or a combination thereof.

DETAILED DESCRIPTION

A PoE LED lighting system is disclosed including a PoE LED driver that includes circuitry for monitoring PoE input current and/or voltage. The PoE LED driver also can include a microprocessor configured to perform an initial measurement of the input current and/or voltage by operating its associated LED light fixture(s) at full output. This initial measurement may be performed after the LED light fixture has been turned off for a period of time sufficient to assure the power and communications cable is at a minimum nominal temperature. Once this initial measurement is performed, and the initial measurement is stored in memory, the PoE input voltage and/or current may be continuously or periodically monitored for variations that may indicate that the cable is heating excessively and causing the voltage to drop and/or the current to increase as compared to the initial measurement. Upon determining that a predetermined value has been exceeded, the microprocessor may command that the power delivered to the associated LED light fixture(s) be reduced or turned off in order to reduce the input current and the associated heating of the power and communications cable. A warning that predetermined value has been exceeded may also be presented as a visual, audible, or digital network message indicating to a user that the gauge of the power and communications cable may be insufficient for the application.

Figure 1:
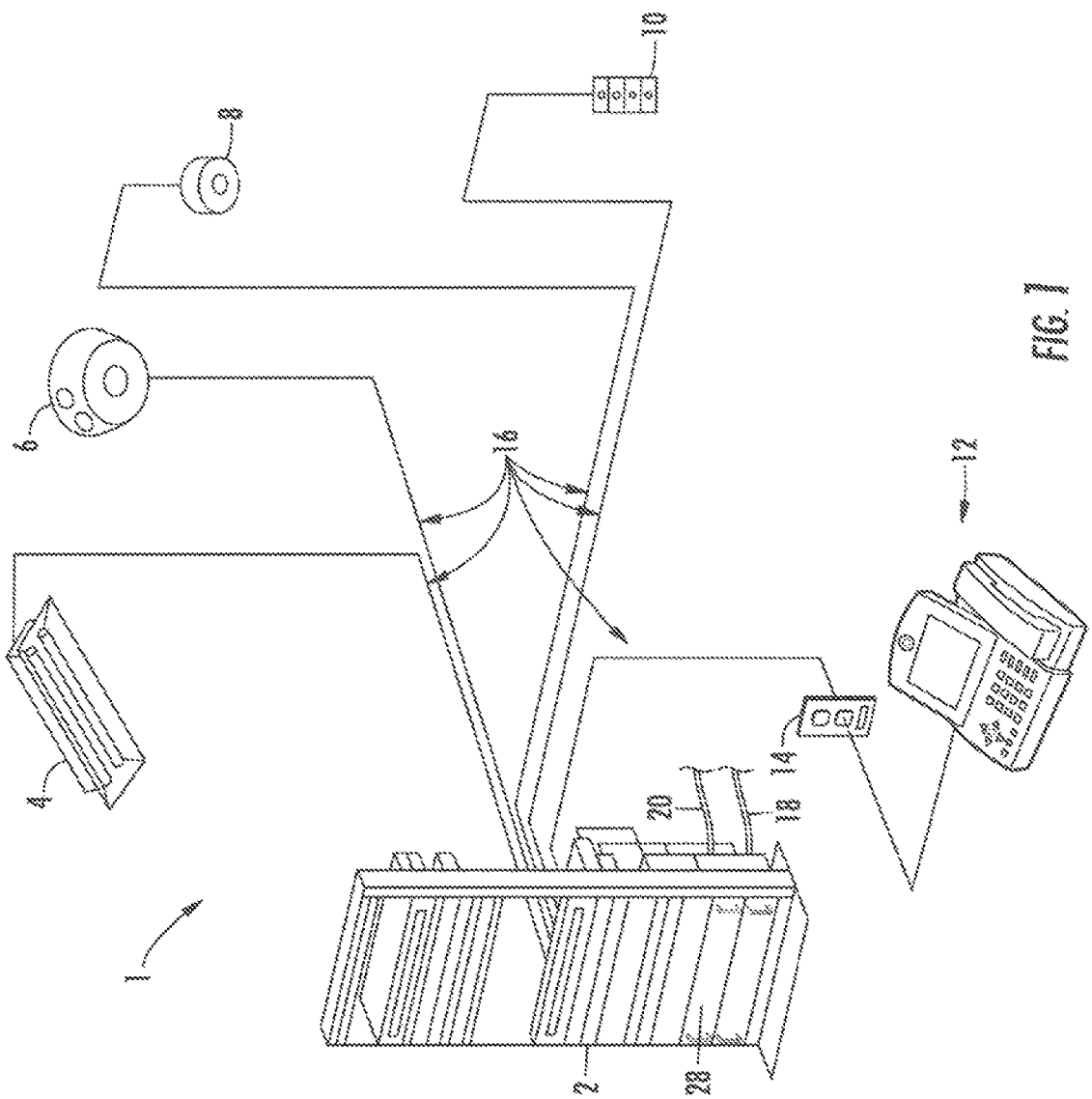
FIG. 1 is a schematic diagram of an exemplary lighting control arrangement according to the disclosure.

Referring to FIG. 1, a simplified lighting power and control system 1 can include a PoE switch 2 coupled to a plurality of PoE powered devices. In some embodiments, the plurality of PoE powered devices may include an LED light fixture 4, an occupancy sensor 6, a photodetector 8 and a first wall switch 10, all of which may be coupled to the PoE switch via associated first power and communications links 16. It will be appreciated that although the illustrated embodiment includes a single LED light fixture 4, occupancy sensor 6, photodetector 8 and wall switch 10, the system 1 can include multiples of each device coupled directly or indirectly to the PoE switch 2 and/or other types of PoE powered devices. In some embodiments, the PoE switch 2 may also be coupled to communications stations such as an IP phone 12 via a wall plate 14.

Power and communication links 16 between the PoE switch 2 and each of the individual identified connected PoE powered devices can be an appropriate Ethernet cable. In some non-limiting exemplary embodiments, the Ethernet cable is a CAT5 cable, a CAT6 cable, or any other cable type now or hereinafter known that is capable of carrying power and control signals. Alternatively, in some embodiments, one or more of the occupancy sensor 6, photodetector 8, first wall switch 10, or other information gathering, sensing, and/or control device(s) may be low-voltage devices that do not connect to the PoE switch 2 via an Ethernet cable, but rather connect to the system via appropriate low-voltage wiring.

Figure 2:
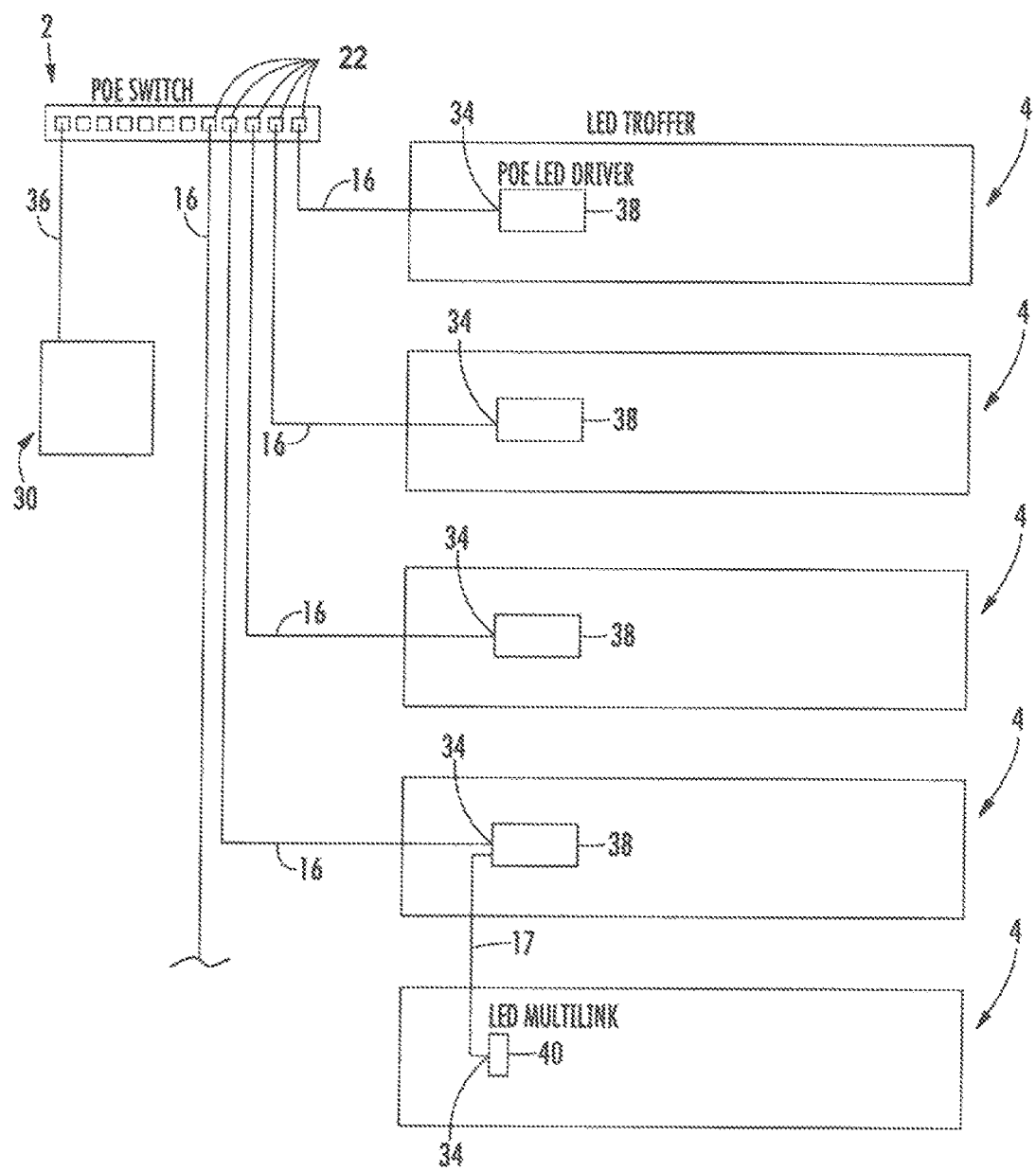
FIG. 2 is a schematic diagram of an exemplary lighting control system according to a first embodiment of the disclosure.

The PoE switch 2 may include a line power connection 18 for receiving power from a building power source. As will be understood, the PoE switch 2 can be a network switch that has PoE injection (i.e., power injection) built in. That is, the PoE switch 2 takes in line power, conditions it, and injects it onto one or more conductors of the power and communications link 16 to connected PoE powered devices. The PoE switch 2 may also include a network connection 20 for receiving control signals from one or more remote control systems such as a building automation system (BAS) 30 (FIG. 2). The BAS 30 can be used to monitor and/or control one or more PoE powered devices of the lighting power and control system 1 via the associated first power and communications links 16. In the illustrated embodiment, the system 1 can include a line power supply interface 28 for providing power to the PoE switch 2 either directly or via the power distribution unit.

FIG. 2 shows a detailed interconnection of the components of the system 1, including a PoE switch 2 coupled to a plurality of LED light fixtures 4. A building automation system (BAS) 30 can be coupled to the PoE switch 2 via communication link 36 to control the PoE switch and to receive information from one or more of the plurality of LED light fixtures via the PoE switch. The PoE switch 2 may provide power to the plurality of LED light fixtures 4 via associated power and communications links 16. The PoE switch 2 may also provide power to associated low-voltage devices (e.g., occupancy sensors, photodetectors, wall switches and the like).

Each of the plurality of LED light fixtures 4 may be coupled directly or indirectly to the PoE switch 2 via an associated power and communication link 16. In some embodiments, the power and communications links 16 can be CAT5 or CAT6 cables, or any other cable type now or hereinafter known that is capable of carrying power and control signals. Connections between the power and communication links 16 and associated components may, for example, be via suitable connectors 34 such as RJ45 connectors. The building automation system (BAS) 30 may be coupled to the PoE switch 2 via a separate communication link 36, which can be an Ethernet cable (i.e., CAT5, CAT6 or any other cable type now or hereinafter known that is capable of carrying control signals).

To power and control the individual lighting elements of the system 1, at least one of the plurality of LED light fixtures 4 can include a PoE LED driver 38. At least one other LED light fixtures 4 may, in some embodiments, include an LED slave controller 40 connected to the PoE LED driver 38. The LED slave controller 40 can be controlled by the PoE LED driver 38 to drive additional connected LED fixtures without the need for additional power, signal conditioning and/or an additional microcontroller. The PoE LED driver 38 may receive command signals via the PoE switch 2 and may control the connected LED light fixtures 4. In the illustrated embodiment, the PoE LED drivers 38 are directly connected to the PoE switch 2 via the associated first communications links 16, while the LED slave controllers 40 are connected, directly or indirectly, to an associated PoE LED driver 34 via a second power and communications link 17. It will be appreciated that the second power and communications link 17 may be an appropriate Ethernet cable such as a CAT5 cable, a CAT6 cable, or any other cable type now or hereinafter known that is capable of carrying power and control signals.

Thus arranged, one or more of the LED light fixtures 4 that includes a PoE LED driver 38 can be used to control and power one or more connected LED light fixtures 4 that include an LED slave controller 40. LED slave controllers can be daisy chained from a single PoE LED driver. All power and control to the LED slave controllers 40 can be provided by that single PoE LED driver 38.

Figure 3:
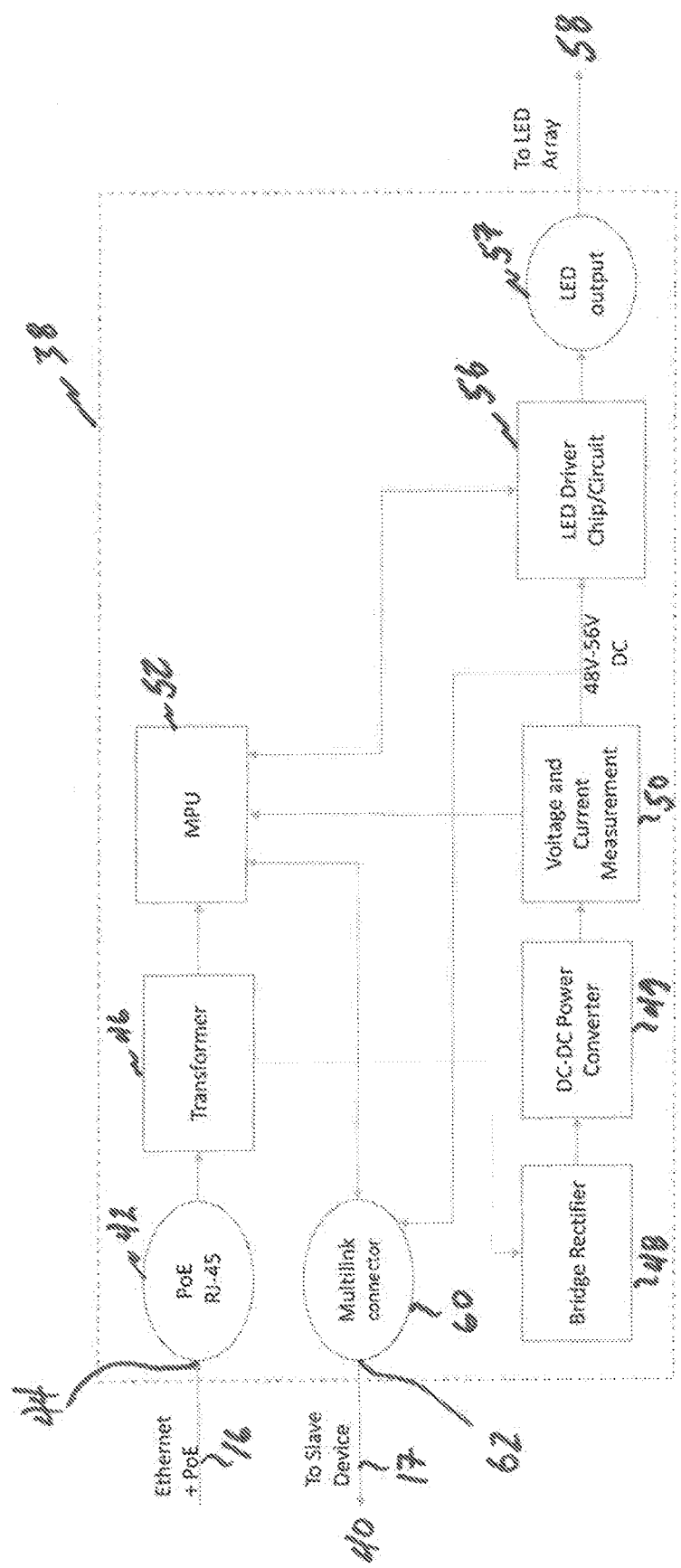
FIG. 3 is a schematic diagram of an LED driver portion of the system of FIG. 2.

Referring now to FIG. 3, exemplary embodiments of the disclosed PoE LED driver 38 will be described. In the disclosed system 1, one or more of the plurality of LED light fixtures 4 will have a controller, which in the illustrated embodiment will be the PoE LED driver 38. The PoE LED driver 38 can be used to control on/off status, dimming, and other desired characteristics of the associated LED light fixture(s) 4.

As mentioned, one or more of the PoE LED drivers 38 can also be connected to one or more LED slave controllers 40 to enable the LED slave controllers to benefit from the signal and power conditioning provided by the PoE LED driver 38. PoE LED driver 38 may include a connector 42, such as an RJ-45 connector, for receiving an end connector 44 of an associated first power and communication link 16 to thereby receive power and communications signals from the PoE switch 2. The connector 42 can be coupled to an appropriate Ethernet transformer 46 with center taps to allow for PoE to be transmitted through the PoE LED driver 38. The signal is split to bridge rectifier 48, which extracts power from the first power and communication link 16 via the Ethernet transformer 46 to provide a DC supply voltage. In one non-limiting exemplary embodiment, the voltage may be about 37-57 Volts DC (VDC). The transformed and rectified power is then provided to a DC-DC power converter 49 which provides a voltage to power a microcontroller (MPU) 52 and associated electronics. In one non-limiting exemplary embodiment, the voltage is up to about 3.3 VDC.

In addition to taking power from the bridge rectifier 48, the MPU 52 also takes input directly from the Ethernet transformer 46 so that control signals carried by the power and communication link 16 can be applied to the MPU. The MPU 52 can include a physical layer (PHY). The PHY may connect a link layer device such as Media Access Control (MAC) to the physical Ethernet cable medium. The PHY device can also include a Physical Coding Sublayer (PCS) and a Physical Medium Dependent (PMD) layer.

In response to control signals received via the PoE switch 2 or from one or more analog inputs (not shown), the MPU 52 may provide an output signal, which in one exemplary embodiment, may include a dimming control signal, to an LED driver chip 56 to control a lighting level of one or more of the LED light fixtures 4. It will also be appreciated that although the description will proceed with reference to a driver "chip," that the system could instead be implemented using a driver "circuit," in lieu of a discrete chip. Thus, the term "chip" will be understood throughout this disclosure to include either a discrete chip, an appropriate circuit, or a combination thereof.

As can be seen, the LED driver chip 56 is supplied with a driving voltage from the bridge rectifier 48 via a voltage and current measurement unit 50. The voltage and current measurement unit 50 may be coupled to the MPU 52 to provide signals to the MPU representative of sensed voltage and current, in a manner that will be described in greater detail later.

In one non-limiting exemplary embodiment, this driving voltage is about 48-56 VDC. The LED driver chip 56 can connect, via an LED output 57, to an LED array 58 associated with the plurality of LED light fixtures 4 to provide a constant current to the LED array. This constant current can be tuned to the specific LED array 58 to meet the particular needs of the array. In one embodiment, the LED driver chip 56 can have the capability to be commanded to vary the constant current via its I$^2$C interface. Alternately, an external resistor (not shown) can be employed to set the current level. In some embodiments, the LED driver chip 56 may have a set amount of current. In other embodiments, the current may be programmable via the first power and communications link 16 or other link coupled to the chip's I$^2$C interface.

In one embodiment, the maximum current that a particular LED array 58 requires is what the LED driver chip 56 will provide. To dim the LED array 58, the LED driver chip 56 can employ pulse width modulation (PWM) in a manner known to those of ordinary skill in the art. It will be appreciated that dimming techniques other than, or in addition to, PWM can be used to provide a desired dimming function.

Figure 4:
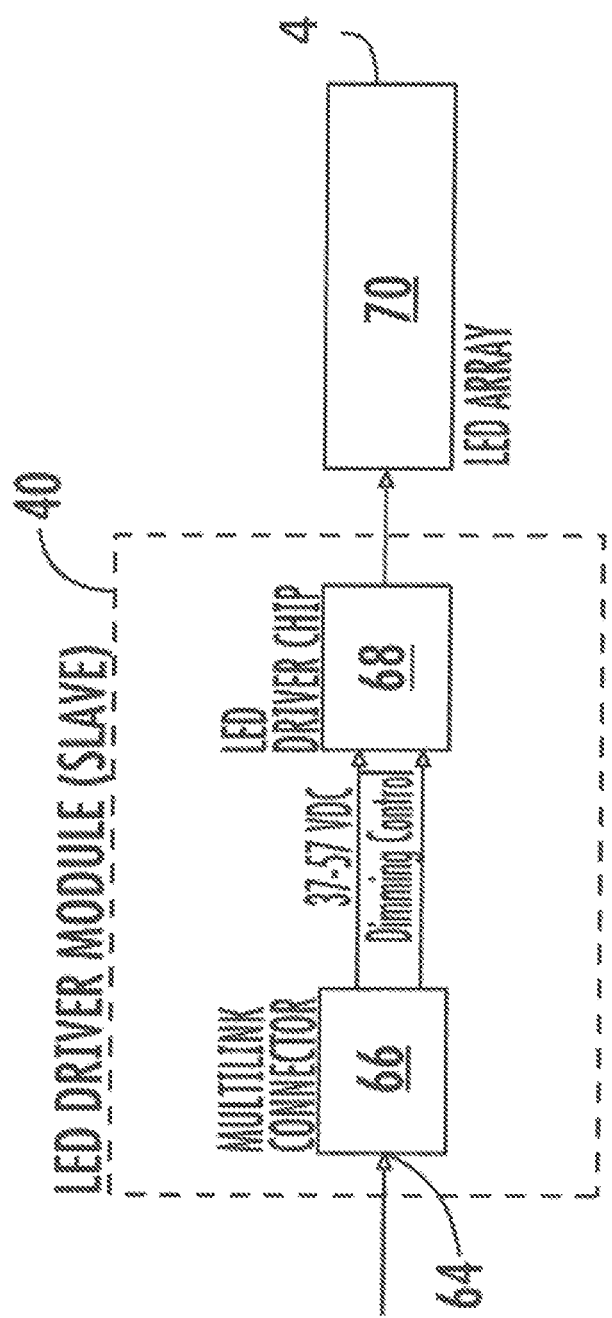
FIG. 4 is a schematic diagram of an LED slave controller portion of the system of FIG. 2.

Referring to FIGS. 3-4, an LED slave controller 40 may be coupled to an output of the PoE LED driver 38, to receive power and control signals from the PoE LED controller. Control signals from the MPU 52, and power (e.g., 37-57 VDC) from the bridge rectifier 48 can be provided to an output connector 60, which in one exemplary embodiment is an RJ-45 connector. The second power and communication link 17 may have a first end connector 62 for coupling to the output connector 60, and a second end connector 64 for coupling to an input connector 66 of the LED slave controller 40. Thus, arranged, the control signals from the MPU 52 and power from the bridge rectifier 48 can be provided to an LED driver chip 68 of the LED slave controller 40. In some embodiments, the LED driver chip 68 of the LED slave controller 40 can be the same as the LED driver chip 56 of the PoE LED driver 38, though this is not necessary. As will also be appreciated, that although the description will proceed with reference to a driver "chip" associated with the LED slave controller 40, the system may instead be implemented using a driver "circuit," in lieu of a discrete chip. Thus, the term "chip" in relation to the LED slave controller 40 will be understood in this disclosure to include either a discrete chip, an appropriate circuit, or a combination thereof.

The LED driver chip 68 of the LED slave controller 40 can be coupled to an LED array 70 associated that may include a plurality of LED light fixtures 4 to provide a constant current to the LED array. This constant current can be tuned to the specific LED array 70 to meet the particular needs of the array. In one embodiment, the LED driver chip 68 will apply the maximum current that the particular LED array 70 requires. To dim the LED array 70, the LED driver chip 68 may employ pulse width modulation in a manner known to those of ordinary skill in the art.

Thus arranged, the PoE LED driver 38 provides the LED slave controller 40 with power from the bridge rectifier, and with a dimming control signal from the MPU 52, along the second power and communication link 17. In this way, the LED slave controller 40 need only include the LED driver chip 68. All other functionality (e.g., transformer, rectifier, signal processing) is provided by the circuitry of the PoE LED driver 38. Thus, power can be daisy chained from a single PoE LED driver 38 to a plurality of LED slave controllers 40.

As mentioned, the PoE LED driver 38 can include a voltage and current measurement unit 50 coupled between the bridge rectifier 48 and the LED driver chip 56. In one non-limiting exemplary embodiment, the voltage and current measurement unit 50 may measure voltage using resistors comprising a voltage divider to scale the voltage to match an analog to digital convertor in the MPU 52. The current may be measured using a current shunt, measuring the voltage differential across a very small amount of resistance. The voltage and current measurement unit 50 can also be communicatively coupled to the MPU 52 so that the voltage and current measurement unit can provide signals representative of the input voltage and/or input current to the MPU. The voltage and current measurement unit 50 may be configured to detect at least one of input current and input voltage (referred to hereinafter as an input electrical parameter) and to provide information representative of the input electrical parameter to the MPU 52. The MPU 52 may be programmed to determine whether the detected input electrical parameter is outside a predetermined range, and to take one or more actions when an out of range condition is determined. In some embodiments, these actions can include adjusting power supplied to one or more associated LED light fixtures 4, activating an alarm to alert a user of the condition, or other appropriate action.

As mentioned, the MPU 52 may be programmed to receive information from the voltage and current measurement unit 50 regarding the input electrical parameter. As will be described in greater detail later, the input electrical parameter can be used to infer whether the connected power and communications link 16 is experiencing excessive temperature increase. Such temperature increases can occur as a result of using a power and communications link 16 that is not rated for the power that will be drawn from the connected LED light fixtures 4 (i.e., the gauge of the link is too small). As previously noted, the power and communications link 16 can be an Ethernet cable such as a CAT5 cable, a CAT6 cable, or any other cable type now or hereinafter known that is capable of carrying power and control signals.

In order to obtain a baseline from which operational values may later be compared, the MPU 52 may obtain an initial measurement value of the input electrical parameter. To obtain this initial measurement, the MPU 52 may command the LED driver chip 56 to drive the associated LED light fixtures 4 to operate at full output. In one embodiment, this initial measurement may be performed after the LED light fixtures 4 have been turned off for a period of time sufficient to assure the power and communications link 16 is at a minimum nominal temperature.

In some embodiments, the MPU 52 may obtain an initial measurement of the input electrical parameter from the voltage and current measurement unit 50 when the power and communications link 16 is initially connected to the PoE input connector 42 of the PoE LED Driver 38 and PoE power is applied. The MPU 52 may obtain a first measurement of input current and/or voltage with the associated LED light fixtures 4 in the OFF state. The MPU 52 may then instruct the LED driver chip 56 to drive the associated LED light fixtures 4 to operate at full output, and may take a second measurement of the input electrical parameter.

The MPU 52 may use the first and second measurements to determine an initial resistance of the power and communications link 16 coupling the PoE LED driver 38 to the PoE switch 2. This initial resistance may be calculated by the MPU 52, or the MPU may infer resistance via the input electrical parameter. In some embodiments, the MPU 52 may determine whether the initial resistance of the power and communications link 16 exceeds a predetermined value, which may be a maximum resistance value for a particular application. If the initial resistance exceeds the predetermined value, the MPU 52 may take one or more of a plurality of actions. In some embodiments, the MPU 52 can cause the LED driver chip 56 to operate the LED light fixtures 4 at a reduced output, where that reduced output corresponds to a reduced amount of power drawn by the LED driver 38 from the PoE switch 2 that remains within the rating of the power and communications link 16. In other embodiments, the MPU 52 can command the LED driver chip 56 not to provide any power to the associated LED light fixtures 4 when the initial resistance is determined to exceed the predetermined value.

Where the initial resistance is determined to exceed the predetermined value, the MPU 52 may provide a signal to the building automation system (BAS) 30, or other connected device, via the power and communications link 16 and PoE switch 2 indicating that the power and communications link 16 is not sized appropriately for the application or that a connection fault exists which may be causing the increased resistance. The signal may cause an audible, visible or other alert to be displayed to a user. The alert may also include information identifying that the LED light fixtures 4 are being operated at reduced output, or it may identify that the LED light fixtures are not being operated until the power and communications link 16 is replaced with an appropriate gauge for the application.

If the initial determined resistance of the power and communications link 16 is determined to be less than or equal to the predetermined value, the MPU 52 may store the initial measured resistance value in non-volatile memory associated with the MPU. The MPU 52 may then instruct the LED driver chip 56 to operate the associated LED light fixtures 4 at normal output. While the LED light fixtures 4 are being operated, the MPU may, at predetermined time intervals, obtain subsequent measurements of the input electrical parameter from the voltage and current measurement unit 50. The MPU 52 may compare each subsequent measurement against a predetermined threshold value, which in one non-limiting exemplary embodiment is the initial measured resistance value stored in non-volatile memory associated with the MPU. In one non-limiting exemplary embodiment, the predetermined time interval may be one second, though this is not critical and other values can be used.

The MPU 52 may determine whether each subsequently measured value of the input electrical parameter, received from the voltage and current measurement unit 50, indicates that the resistance of the power and communications link 16 exceeds the predetermined value, or if it remains at or below the predetermined value. If the measured value indicates that the resistance of the power and communications link 16 remains at or below the predetermined value, then the MPU 52 may simply continue to obtain periodic measurements of the input electrical parameter from the voltage and current measurement unit 50 and compare them to the predetermined value.

If, however, a subsequent measured value of the input electrical parameter, received from the voltage and current measurement unit 50, indicates that the resistance of the power and communications link 16 exceeds the predetermined value, the MPU 52 may take one or more of a plurality of actions. In some embodiments, the MPU 52 can cause the LED driver chip 56 to operate the LED light fixtures 4 at a reduced output. In some embodiments, this reduced output can be an incrementally reduced output, such as a predetermined decrement of power provided to the associated LED light fixtures 4. This predetermined decrement may directly correlate to a desired output reduction, or it may be a small amount that enables the system to reduce power in small increments so as to "zero in" on an acceptable output reduction. Upon reducing the power provided to the LED light fixtures 4, the MPU 52 may continue to make additional periodic comparisons of the input electrical parameter to determine if the power reduction has resulted in an appropriate reduction in the temperature of the power and communications link 16 (as implied by the measured current, voltage, or determined resistance). If subsequent comparisons of the input electrical parameter indicate that the resistance of the power and communications link 16 is equal to or less than the predetermined value, then the MPU 52 may command the LED driver chip 56 to continue operating the LED light fixtures 4 at the reduced power. The MPU 52 may send an alert in the manner previously described in relation to the initial measurement process so that the system and/or a user can be made aware that the system is operating at reduced power.

In other embodiments where a subsequent measured value of the input electrical parameter, received from the voltage and current measurement unit 50, indicates that the resistance of the power and communications link 16 exceeds the predetermined value, the MPU 52 may simply command the LED driver chip 56 not to provide any power to the associated LED light fixtures 4. The MPU 52 may also send an alert in the manner previously described in relation to the initial measurement process. In some embodiments, the alert may enable the user to turn power to the associated fixtures off or to further reduce power to those fixtures beyond the reduction automatically implemented by the MPU 52.

It will be appreciated that the MPU 52 may receive signals representative of input current and/or voltage measured by the voltage and current measurement unit 50, and may compare those discrete values against one or more predetermined values. These predetermined values can be in the form of values of the input electrical parameter obtained via the voltage and current measurement unit 50 and stored in non-volatile memory associated with the MPU 52. Alternatively, the predetermined values can be pre-stored values in the form of a look up table. Predetermined values may be in the form of voltage values, current values, resistance values, or combinations thereof.

Where the input electrical parameter is input voltage, the predetermined value may be a minimum voltage level. Where the input electrical parameter is input current, the predetermined value may be a maximum current level.

It will thus be appreciated that the technique for controlling the operating temperature of one or more of the power and communications links 16 is an indirect sensing technique such that the predetermined and stored values of current, voltage and/or resistance are proportional to the temperature of the associated power and communications link.

As previously mentioned, the MPU 52 may send alerts to a BAS 30 and/or another connected user device to provide one or more alerts such as e-mails, text messages and the like, to indicate when a temperature of one or more of the power and communications links is operating at an elevated temperature, as implied by one or more of measured input current, voltage or calculated resistance. In addition, the MPU 52 may cause such current, voltage and/or calculated resistance values to be logged in non-volatile memory associated with the MPU and/or in remote storage associated with the PoE switch, BAS or other connected device. In this manner, trend analyses can be performed using the collected data.

Some embodiments of the disclosed system may be implemented, for example, using a storage medium, a computer-readable medium or an article of manufacture which may store an instruction or a set of instructions that, if executed by a machine (i.e., processor or microcontroller), may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

The invention claimed is:

1. A system for controlling operation of an LED lighting system, comprising:
   a Power over Ethernet (PoE) LED driver connectable to a PoE switch via a power and communication link, the PoE LED driver comprising a microcontroller for controlling an LED driver chip to operate an associated LED lighting fixture;
   a voltage and current measurement unit coupled to the microcontroller, the voltage and current measurement unit for receiving power from the power and communication link, and for providing signals to the microcontroller, the provided signals representative of an input electrical parameter of the power and communication link;
   wherein the microcontroller is programmed to:
      compare the signals representative of the input electrical parameter against a predetermined value; and
      command operation of the LED driver chip based on the comparison.

2. The system of claim 1, wherein the PoE Switch is a midspan power source.

3. The system of claim 1, wherein the input electrical parameter is voltage and the predetermined value is a minimum voltage.

4. The system of claim 3, wherein when the input electrical parameter is less than the predetermined value, the microcontroller is programmed to command the LED driver chip to reduce a power supplied to the LED light fixture.

5. The system of claim 1, wherein the input electrical parameter is current and the predetermined value is a maximum current.

6. The system of claim 5, wherein when the input electrical parameter is greater than the predetermined value, the microcontroller is programmed to command the LED driver chip to reduce a power supplied to the LED light fixture.

7. The system of claim 1, wherein the input electrical parameter is representative of an operating temperature of the power and communication link.

8. The system of claim 1, wherein the predetermined value is stored in non-volatile memory associated with the microcontroller.

9. The system of claim 1, wherein the predetermined value is an initial measured value of the input electrical parameter obtained with the power and communication link at a nominal temperature and the LED light fixture driven at full output by the LED driver chip.

10. The system of claim 1, wherein the microcontroller is programmed to repeat the compare and command steps at a predetermined time interval.

11. The system of claim 1, wherein the microprocessor is programmed to send an alert signal to a building automation system or other remote device, via the power and communication link and the PoE switch, when the input electrical parameter is representative of a resistance value for the power and communication link that exceeds the predetermined value.

12. The system of claim 1, wherein the microprocessor is programmed to store in non-volatile memory information representative of the signals received from the voltage and current measurement unit.

13. The system of claim 1, wherein the power and communication link comprises a category 5 (CAT5) cable, category 6 (CAT6) cable, or any other cable type capable of carrying power and control signals.

14. The system of claim 1, the PoE LED driver comprising an Ethernet transformer for receiving the first control signals from the first power and communication link and for providing conditioned first control signals to the microcontroller.

15. The system of claim 14, the PoE LED driver comprising a bridge rectifier for receiving the power from the first power and communication link and for providing rectified direct current (DC) power to the voltage and current measurement unit.

16. The system of claim 1, wherein the LED driver chip is configured to dim an LED array of the associated LED lighting fixture in response to a command from the microcontroller.

17. The system of claim 1, wherein the LED driver chips comprises a circuit, a discrete chip, or a combination thereof.

* * * * *